United States Patent [19]

Maehara et al.

[11] Patent Number: 4,476,287

[45] Date of Patent: Oct. 9, 1984

[54] PROCESS FOR PRODUCING POLYBUTADIENE RUBBER WITH ENHANCED MECHANICAL STRENGTH

[75] Inventors: Nobunori Maehara; Norihumi Utada, both of Ichihara; Taiji Oda, Chiba; Hidetomo Ashitaka, Ichihara; Hideo Ishikawa, Chiba, all of Japan

[73] Assignee: Ube Industries, Ltd., Yamaguchi, Japan

[21] Appl. No.: 448,232

[22] Filed: Dec. 9, 1982

[30] Foreign Application Priority Data

Dec. 24, 1981 [JP] Japan ................................ 56-208108

[51] Int. Cl.$^3$ ............................................. C08F 4/26
[52] U.S. Cl. ........................................ 526/92; 526/140
[58] Field of Search ............... 526/66, 92; 525/247, 525/53

[56] References Cited

U.S. PATENT DOCUMENTS

| | | | |
|---|---|---|---|
| 3,970,724 | 7/1976 | Schoenberg et al. | 526/66 |
| 4,182,814 | 1/1980 | Bernemann | 526/92 |
| 4,340,685 | 7/1982 | Takeuchi et al. | 525/247 |

*Primary Examiner*—Paul R. Michl
*Attorney, Agent, or Firm*—Burgess, Ryan & Wayne

[57] ABSTRACT

A polybutadiene rubber having an enhanced mechanical strength is produced in such a manner that the content of water in a solution of 1,3-butadiene in an inert organic solvent is controlled to 0.2 to 5 millemoles per liter of 1,3-butadiene; a first polymerization mixture is prepared from the controlled 1,3-butadiene solution, an organic aluminum compound of the formula Al $R_nX_{3-n}$, wherein R=$C_{1-6}$ alkyl, phenyl, or cycloalkyl, X=halogen, and n=1.5–2.0, and a cobalt compound, for example, by aging a mixture of the controlled 1,3-butadiene solution with the aluminum compound for at least one minute and then by admixing the aged mixture with the cobalt compound; the first polymerization mixture is subjected to a cis-1,4-polymerization; a second polymerization comprising the resultant cis-1,4-polybutadiene, non-reacted 1,3-butadiene, the inert organic solvent, and a catalyst comprising an organic aluminum compound of the formula $AlR_3$, a cobalt compound, and carbon disulfide is subjected to a 1,2-polymerization to produce a polybutadiene rubber consisting essentially of 5% to 30% by weight of a boiling n-hexane-insoluble fraction and 70% to 95% by weight of a boiling n-hexane-soluble fraction thereof and having an excellent mechanical strength; and after the 1,2-polymerization is shortstopped, the resultant polybutadiene rubber is isolated from the 1,2-polymerization mixture.

34 Claims, 2 Drawing Figures

PROCESS FOR PRODUCING POLYBUTADIENE RUBBER WITH ENHANCED MECHANICAL STRENGTH

FIELD OF THE INVENTION

The present invention relates to a process for producing a polybutadiene rubber having an enhanced mechanical strength. More particularly, the present invention relates to a process for producing a polybutadiene rubber comprising 5% to 30% by weight of a fraction insoluble in n-hexane at the boiling temperature thereof and 70% to 95% by weight of a fraction soluble in the boiling n-hexane and having an excellent mechanical strength.

DESCRIPTION OF THE PRIOR ART

Large amounts of cis-1,4-polybutadiene, produced by polymerizing 1,3-butadiene in the presence of a cis-1,4-polymerization catalyst, are used as materials for tires and other rubber products. One of the reasons why large amounts of cis-1,4-polybutadiene are used in the rubber industry is that the rubber products produced therefrom exhibit high resilience, a low heat buildup, and superior abrasion resistance and, therefore, are superior to general purpose rubber products. Conventional cis-1,4-polybutadiene rubber products, however, suffer from the disadvantages of poor tear resistance and small cut growth resistance.

In order to eliminate the above-mentioned disadvantages of conventional cis-1,4-polybutadiene rubber products, Japanese Examined Patent Publication (Kokoku) No. 49-17666 discloses a new type of polybutadiene rubber produced by first polymerizing 1,3-butadiene in an inert organic solvent in the presence of a cis-1,4-polymerization catalyst and then second polymerizing 1,3-butadiene in the presence of a 1,2-polymerization catalyst. The publication contains some examples of processes in which polybutadiene rubbers are vulcanized and in which the resultant vulcanized rubber products exhibit excellent tear resistance and cut growth resistance.

The above-mentioned process, however, has several disadvantages which have kept it from being utilized in the polybutadiene rubber industry. That is, in the second polymerization procedure, carbon disulfide is used as a catalytic ingredient of the 1,2-polymerization catalyst. After the first and second polymerization procedures are completed, however, the carbon disulfide cannot easily be separated from the non-reacted 1,3-butadiene and the inert organic solvent, especially, from the non-reacted 1,3-butadiene. Also, carbon disulfide causes some undesirable side reactions when contacted with a halogen-containing organic aluminum compound in the absence of water, particularly in the presence of a cobalt compound. Products of such side reactions hinder the polymerization of 1,3-butadiene. Accordingly, it is essential to handle the carbon disulfide very carefully so as to prevent the above-mentioned side reactions.

Under these circumstances, a strong demand exists in the polybutadiene rubber industry for a new process for continuously producing a polybutadiene rubber having enhanced tear resistance and cut growth resistance in addition to excellent impact resilience and abrasion resistance and overcoming the disadvantages incurred with use of carbon disulfide.

SUMMARY OF THE INVENTION

An object of the present invention is to provide a process for producing a polybutadiene rubber having enhanced mechanical strength, for example, excellent tear resistance cut growth resistance, and abrasion resistance.

Another object of the present invention is to provide a process for producing a polybutadiene rubber wherein the carbon disulfide used as a catalytic ingredient of the second polymerization catalyst can be easily separated from non-reacted 1,3-butadiene and the inert organic solvent.

The above-mentioned objects can be attained by the process of the present invention which comprises the succesive steps of:

(A) mixing 1,3-butadiene with an inert organic solvent to provide a 1,3-butadiene solution;

(B) controlling the concentration of water contained in the 1,3-butadiene solution to from 0.2 to 5 millimoles per liter of the 1,3-butadiene solution;

(C) subjecting a first polymerization mixture, which comprises the controlled 1,3-butadiene solution and a cis-1,4-polymerization catalyst comprising:

(a) an aluminum catalytic ingredient consisting of at least one organic aluminum compound of the formula (I):

$$AlR_nX_{3-n} \qquad (I)$$

wherein R represents a member selected from the group consisting of alkyl radicals having 1 to 6 carbon atoms, a phenyl radical, and cycloalkyl radical; X represents a halogen atom, and n represents the number of 1.5 to 2.0; and (b) a cobalt catalytic ingredient consisting of at least one cobalt compound, to a cis-1,4-polymerization to convert at least a portion of the 1,3-butadiene contained in the first polymerization mixture to cis-1,4-polybutadiene;

(D) subjecting a second polymerization mixture, which comprises the resultant cis-1,4-polybutadiene, non-reacted 1,3-butadiene, organic solvent, and 1,2-polymerization catalyst comprising:

(c) a cobalt catalytic ingredient consisting of at least one cobalt compound, (d) an aluminum catalytic ingredient consisting of at least one organic aluminum compound of the formula (II):

$$AlR_3 \qquad (II)$$

wherein R is the same as defined above; and (e) carbon disulfide, to 1,2-polymerization to provide a polybutadiene rubber consisting essentially of 5% to 30% by weight of a boiling n-hexane-insoluble fraction and 70% to 95% by weight of a boiling n-hexane-soluble fraction thereof;

(E) stopping the 1,2-polymerization by adding a polymerization shortstopper to the resultant second polymerization mixture; and (F) isolating the resultant polybutadiene rubber from the stopped second polymerization mixture.

In the process of the present invention, the first polymerization mixture may be prepared by mixing the controlled 1,3-butadiene solution of step (B) with the 1,4-polymerization catalyst or may be provided by admixing the controlled 1,3-butadiene solution of step (B)

with the aluminum catalytic ingredient (a) by aging the resultant admixture for at least one minute and, then, by mixing the aged mixture with the cobalt catalytic ingredient (b).

Also, in the process of the present invention, after the resultant polybutadiene is isolated from the stopped second polymerization mixture, the isolation residue can be processed for elimination of the carbon disulfide and for recovery of a mixture of the non-reacted 1,3-butadiene and the inert organic solvent substantially free from carbon disulfide.

DETAILED EXPLANATION OF THE INVENTION

In step (A) in the process of the present invention, a 1,3-butadiene solution is prepared by mixing 1,3-butadiene in an inert organic solvent. In this step, it is preferable that the amount of 1,3-butadiene be at least 3%, more preferably, 3% to 40%, based on the sum of the weight of 1,3-butadiene and the inert organic solvent.

The inert organic solvent is not limited to a specific type of liquid compound as long as the solvent is able to dissolved therein the cis-1,4-polybutadiene produced in step (C). Usually, the inert organic solvent consists essentially of at least one member selected from the group consisting of aromatic hydrocarbons, for example, benzene, toluene, and xylene; aliphatic hydrocarbons, for example, n-heptane and n-hexane; cycloaliphatic hydrocarbons, for example, cyclohexane and cyclopentane; and halogenated derivatives of the above-mentioned hydrocarbons, for example, dichloromethane and chlorobenzenes.

In step (B) of the process of the present invention, the concentration of water contained in the 1,3-butadiene solution is controlled to a desired value in the range of from 0.2 to 5 millimole, preferably, from 0.5 to 5 millimoles, per liter of the 1,3-butadiene solution. The control of the water concentration can be effected by any conventional water-controlling method.

A concentration of water in the 1,3-butadiene solution less than 0.2 millimole/l or more than 5 millimoles/l will result in an unsatisfactory yield of cis-1,4-polybutadiene in step (C). If it is found that the concentration of water in the 1,3-butadiene solution prepared in step (A) is the same as that desired, the 1,3-butadiene solution can be directly subjected to step (C). The measurement and control of the water concentration can be carried out by a conventional method. Before the controlled 1,3-butadiene solution is subjected to step (C), it is preferable that the solution be cooled to a temperature of 10° C. or less.

In step (C), a first polymerization mixture comprising the controlled 1,3-butadiene solution and a cis-1,4-polymerization catalyst is subjected to a first polymerization procedure. The cis-1,4-polymerization catalyst comprises (a) an aluminum catalytic ingredient consisting of at least one organic aluminum compound of the formula (I):

$$AlR_nX_{3-n} \qquad (I)$$

wherein R represents a member selected from the group consisting of alkyl radicals having 1 to 6 carbon atoms, a phenyl radical, and cycloalkyl radical, preferably, having 5 to 7 carbon atoms; X represents a halogen atom, preferably, a chlorine atom; and n represents the number of 1.5 to 2.0 and (b) a cobalt catalytic ingredient consisting of at least one cobalt compound which is soluble in the inert organic solvent used for dissolving 1,3-butadiene therein.

The organic aluminum compound of the formula (I) is preferably selected from the group consisting of diethyl aluminum monochloride, diethyl aluminum monobromide, diisobutyl aluminum monochloride, and ethyl aluminum sesquichloride.

The cobalt compounds usable for the cis-1,4-polymerization catalyst are not limited to a specific type of compound as long as the cobalt compounds are soluble in the inert organic solvent contained in the 1,3-butadiene solution. Preferably, the cobalt compound is selected from the group consisting of cobalt-ketone complexes, for example, cobalt (II) acetylacetonate and cobalt (III) acetylacetonate; cobalt-ketoacid ester complexes, for example, cobalt acetacetic ethylester complexes; cobalt salts of organic carboxylic acids having 6 or more carbon atoms, for example, cobalt octoate, cobalt naphthenate, and cobalt benzoate; cobalt halide complexes, for example, cobalt chloride-pyridine complexes and cobalt chloride-ethyl alcohol complexes; and cobalt complexes coordinated with butadiene, for example, (1,3-butadiene) 1-(2-methyl-3-butenyl)-$\pi$-allyl-cobalt which complexes are prepared by mixing cobalt compounds with an organic aluminum compound, organic lithium compound or alkyl magnesium compound and 1,3-butadiene.

The first polymerization mixture can be prepared by mixing the controlled 1,3-butadiene solution with the cis-1,4-polymerization catalyst. In another method, the first polymerization mixture can be prepared by mixing the controlled 1,3-butadiene solution with the aluminum catalytic ingredient (a') consisting of at least one organic aluminum compound of the formula (Ia):

$$AlR_2X \qquad (Ia)$$

wherein R and X are the same as defined above, by aging the resultant mixture for at least one minute and then by admixing the aged admixture with the cobalt catalytic ingredient (b).

In the above-mentioned first polymerization mixture-preparation method including the aging procedure, it is important that the mixture of the controlled 1,3-butadiene solution with the aluminum catalytic ingredient be aged for one minute or more in the absence of the cobalt catalytic ingredient. This aging procedure is effective for enhancing the catalytic activity of the resultant cis-1,4-polymerization catalyst, for restricting formation of a gel in the first polymerization step, and for restricting deposit of polymer (including the gel) onto the inside surface of a vessel in which the cis-1,4-polymerization is carried out. The above-mentioned effects of the aging procedure are also effective for prolonging the lifetime in which the vessel can be continuously used for not only the cis-1,4-polymerization but also the 1,2-polymerization.

The above-mentioned effects of the aging procedure can be further enhanced by preventing contamination of water into the aged mixture after the aging procedure is completed.

If a mixture of the inert organic solvent and the aluminum catalytic ingredient (a') is aged in the absence of 1,3-butadiene or if a mixture of the controlled 1,3-butadiene solution with the cobalt catalytic ingredient (b) is aged, the above-mentioned effects of the aging procedure are extremely small. It is thus impossible to prevent the deposit of the cis-1,4-polybutadiene onto the cis-1,4-polymerization vessel.

The aging procedure of the mixture consisting of the controlled 1,3-butadiene solution and the aluminum catalytic ingredient (a) is carried out for at least one minute, preferably, from 2 minutes to 2 hours, preferably, at a temperature of 10° C. to 80° C., more preferably, 10° C. to 50° C. If the aging time is less than one minute, it is difficult to attain the above-mentioned effects of the aging procedure.

After the aging procedure is completed, the aged mixture is preferably cooled to a temperature of 10° C. or less. The resultant cooled mixture is then admixed with the cobalt catalytic ingredient (b) while the admixture is stirred.

It is preferable that the cis-1,4-polymerization catalyst contain the aluminum catalytic ingredient (a) or (a') in an amount of at least 0.1 millimole, more preferably, from 0.5 to 50 millimoles, per mole of 1,3-butadiene in the first polymerization mixture. Also, it is preferable that it contain the cobalt catalytic ingredient (b) in an amount of at least 0.001 millimole, more preferably, at least 0.005 millimole, still more preferably, from 0.007 to 0.07 millimoles, per mole of 1,3-butadiene in the first polymerization mixture. Furthermore, it is preferred that the cis-1,4-polymerization catalyst have a molar ratio of the aluminum catalytic ingredient (a) or (a') to the cobalt catalytic ingredient (b) of at least 5:1, more preferably, at least 15:1, still more preferably, from 50:1 to 500:1.

The resultant first polymerization mixture is subjected to the cis-1,4-polymerization at a temperature of, preferably, from −20° C. to 80° C., more preferably, from 5° C. to 50° C., for a polymerization time, i.e., the average time for which the first polymerization mixture resides in the cis-1,4-polymerization vessel, of from 10 minutes to 10 hours, while the mixture is stirred in the vessel. The polymerization vessel for the cis-1,4-polymerization is not limited to a specific type of vessel. For example, a polymerization vessel with a high viscosity stirring apparatus, for instance, as disclosed in Japanese Examined Patent Publication (Kokoku) No. 40-2645, can be used for carrying out the cis-1,4-polymerization procedure.

In the cis-1,4-polymerization procedure, it is preferred that the resultant polybutadiene contain 90% or more, more preferably, 95% or more, of cis-1,4-structure and exhibit an intrinsic viscosity of 1.5 to 8.0, more preferably, 1.5 to 5.0, determined in toluene at a temperature of 30° C.

In order to produce the cis-1,4-polybutadiene having a desired intrinsic viscosity [η]toluene 30° C., the molecular weight of the resultant cis-1,4-polybutadiene can be controlled by adding a molecular weight modifier to the first polymerization mixture. The molecular weight modifier preferably consists essentially of at least one member selected from non-conjugated diene compounds, for example, cyclooctadiene and allene (isoallylene), ethylene, and α-olefin compounds, for instance, propylene and butene-1.

In order to prevent the formation of a gel in the cis-1,4-polymerization, it is preferred that an anti-gelling agent be added to the first polymerization mixture. The anti-gelling agent may be selected from conventional anti-gelling agents.

After the cis-1,4-polymerization procedure is completed, a second polymerization mixture containing the resultant cis-1,4-polybutadiene in step (B) and non-reacted 1,3-butadiene, which are dissolved in the inert organic solvent, and a 1,2-polymerization catalyst is subjected to a 1,2-polymerization. The second polymerization mixture can be prepared by mixing the resultant cis-1,4-polymerization mixture obtained in step (B) with the 1,2-polymerization catalyst and, if necessary, an additional amount of fresh 1,3-butadiene which has been preferably cooled to a temperature of 10° C. or less. In this case, it is preferred that the amount of the non-reacted 1,3-butadiene in the second polymerization mixture be in the range of from 3% to 35% by weight.

The 1,2-polymerization catalyst comprises a cobalt catalytic ingredient (c) consisting of at least one cobalt compound, an aluminum catalytic ingredient (d) consisting of at least one organic aluminum compound of the formula (II):

$$AlR_3 \tag{II}$$

wherein R is the same as defined above, and another catalytic ingredient (e) consisting of carbon disulfide.

The cobalt compounds usable for the cobalt catalytic ingredient (c) can be selected from the same group of cobalt compounds as those usable for the cobalt catalytic ingredient (b).

The aluminum compounds of the formula (II) are preferably selected from the group consisting of triethyl aluminum, trimethyl aluminum, triisobutyl aluminum, and triphenyl aluminum.

The carbon disulfide is preferably free from water.

Each of the catalytic ingredients may be fed, in the form of a solution thereof in the inert organic solvent or in 1,3-butadiene, to the second polymerization mixture. The solution is preferably cooled to a temperature of 10° C. or less.

In the second polymerization mixture, the amount of the 1,2-polymerization catalyst is variable depending on the types of the catalytic ingredients, component of the catalyst, and the polymerization conditions. However, it is preferred that the cobalt catalytic ingredient (c) be used in an amount of 0.005 millimole or more, preferably, from 0.01 to 5 millimoles; the aluminum catalytic ingredient (d) in an amount of at least 0.1 millimole, preferably, from 0.5 to 50 millimoles; and carbon disulfide (e) in an amount of at least 0.001 millimole, more preferably, from 0.01 to 10 millimoles, each per mole of 1,3-butadiene in the second polymerization mixture.

In the case where the type of the cobalt catalytic ingredient (b) in the cis-1,4-polymerization catalyst is the same as that of the cobalt catalytic ingredient (c) in the 1,2-polymerization catalyst, the cis-1,4-polymerization catalyst may contain the cobalt compound in an amount necessary for both the first and second polymerization procedures. In this case, the second polymerization mixture can be prepared by mixing the resultant first polymerization mixture which contains the cobalt catalytic ingredient, in the necessary amount for the 1,2-polymerization catalyst, with the aluminum catalytic ingredient and carbon disulfide.

The second polymerization mixture is subjected to the 1,2-polymerization procedure preferably at a temperature of from −20° C. to 80° C., more preferably, from 5° C. to 50° C. for 10 minutes to 10 hours, under either atmospheric pressure or increased pressure.

The 1,2-polymerization procedure is carried out by stirring the second polymerization mixture in a polymerization vessel. Since the second polymerization mixture exhibits a high viscosity during the 1,2-polymerization procedure, the resultant polymer tends to deposit onto the surface of the polymerization vessel. Therefore, it is preferable that the polymerization vessel be provided with a device for removing the deposited polymer, as described in Japanese Examined Patent Publication No. 40-2645.

After the 1,2-polymerization procedure is completed, it is preferred that the resultant 1,2-polymerization mixture which contains the resultant polybutadiene rubber, non-reacted 1,3-butadiene, carbon disulfide, cobalt catalytic ingredient(s), aluminum catalytic ingredients, and inert organic solvent be moved to a polymerization shortstopping vessel and that a polymerization shortstopper be added to the 1,2-polymerization mixture so as to shortstop the 1,2-polymerization.

The polymerization shortstopper is not limited to a specific type of compounds as long as the compounds can be reacted with the aluminum compounds of the formula (II) so as to deactivate the aluminum catalytic ingredient (d). Usually, the polymerization shortstopper consists of at least one member selected from aliphatic alcohols, for example, methyl alcohol and ethyl alcohol; water; inorganic acids, for example, hydrochloric acid and sulfuric acid; organic acids, for instance, acetic acid and benzoic acid; monoethanolamine; ammonia; phosphorous esters, for example, tris(nonylphenyl)phosphite; and hydrogen chloride gas. The polymerization shortstopper may be in the form of an aqueous solution or an alcoholic solution.

After the 1,2-polymerization procedure is terminated, the resultant 1,2-polymerization mixture is subjected to a step for isolating the resultant polybutadiene rubber therefrom. This isolation can be effected by adding a precipitating agent, for example, methyl alcohol to the polymerization mixture or by evaporating volatile substances from the polymerization mixture while blowing or not blowing steam into the polymerization mixture, so as to cause the polybutadiene rubber to deposit from the polymerization mixture. The deposited polybutadiene rubber is separated from the polymerization mixture, washed with methyl alcohol or hot water, and then dried.

In order to protect the polybutadiene rubber from degradation, it is preferred that an anti-oxidant be added to the resultant polymerization mixture during the shortstopping procedure, or be added to a slurry of the polybutadiene rubber.

In the 1,2-polymerization procedure, a polybutadiene rubber consisting essentially of 5% to 30%, preferably, 7% to 15% by weight of a boiling n-hexane-insoluble fraction and 70% to 95%, preferably, 85% to 93%, by weight of a boiling n-hexane-soluble fraction thereof, is obtained. The boiling n-hexane-insoluble fraction usually exhibits a melting point of from 180° C. to 215° C.

After the polybutadiene rubber is isolated from the polymerization mixture, the isolation residue is subjected to a recovery procedure in which the non-reacted 1,3-butadiene and the inert organic solvent, which are substantially free from carbon disulfide, are recovered.

In the recovery procedure, the non-reacted 1,3-butadiene and the inert organic solvent are recovered by means of distillation. The carbon disulfide is eliminated by means of adsorption thereof on an adsorbing agent or of addition reaction thereof with a reactant capable of reacting with carbon disulfide and of forming an addition reaction product insoluble in the inert organic solvent, soluble in water, or having a boiling point significantly higher than that of 1,3-butadiene and the inert organic solvent.

In a recovery method, first, a mixture of the non-reacted 1,3-butadiene, the inert organic solvent, and carbon disulfide is distilled from the isolation residue of the 1,2-polymerization mixture. Then, the carbon disulfide is removed from the distilled mixture by means of the adsorption of the addition reaction.

In another recovery method, carbon disulfide is eliminated from the isolation residue of the 1,2-polymerization mixture by means of the adsorption or the addition reaction so as to provide a remaining solution free from carbon disulfide. Then, the non-reacted 1,3-butadiene and the inert organic solvent are recovered from the remaining solution by means of distillation.

In still another recovery method, first, a mixture of the non-reacted 1,3-butadiene and carbon disulfide is distilled from the residue of the second polymerization mixture so as to provide a distillation residue containing the inert organic solvent and being substantially free from carbon disulfide; second, the carbon disulfide is eliminated from the distilled mixture by means of the adsorption or the addition reaction so as to provide the non-reacted 1,3-butadiene substantially free from carbon disulfide; and, finally, the inert organic solvent is recovered from the distillation residue by means of distillation.

In the adsorption elimination, carbon disulfide is adsorbed by an adsorbing agent consisting of, for example, a basic anion exchange resin which usually contains amino radicals. This adsorption elimination can be carried out either in a batch-type procedure or in a flow-type continuous procedure at a temperature of from 5° C. to 60° C. for a contact time of from one to 60 minutes. The basic anion exchange resin can be selected from commercial basic anion exchange resins, for instance, Amberlite IR-45 (trademark, made by Rohm & Haas), Diaion WA-21 (trademark, made by Mitsubishi Chemical Ind.), Dowex 3 (trademark, made by Dow Chemical), and Dulite A-7 (trademark, made by Diamond Shamrock). When the adsorption elimination is carried out in the batch-type procedure, it is preferable that the basic anion exchange resin be used in an amount of from 0.1 to 10 parts by volume per 100 parts by volume of the liquid containing the carbon disulfide. When the flow-type continuous procedure is applied to the adsorption elimination, it is preferable that the carbon disulfide-containing liquid be passed at a space velocity of from 2 to 15 through the adsorbing agent. The term "space velocity" refers to the quotient of the flow rate of the liquid in $m^3/hr$ with the volume of the adsorbing agent in m³ and is usually expressed by an absolute number.

In the adsorption elimination of carbon disulfide, it is preferable that the basic anion exchange resin be swollen with an inert organic solvent before the resin is brought into contact with the carbon disulfide-containing liquid.

The adsorption of carbon disulfide by a weak basic anion exchange resin causes a small amount of hydrogen sulfide ($H_2S$) to be generated by a side reaction. Therefore, it is preferable that the adsorption residue liquid be washed with water or be treated with a strong basic anion exchange resin, for example, Diaion PA-316 (trademark, made by Mitsubishi Chemical Ind.), to eliminate the $H_2S$ from the residual liquid.

The resultant carbon disulfide-adsorbed anion exchange resin can be reactivated by washing it with an acid aqueous solution and then with an alkali aqueous solution. The adsorbed carbon disulfide is recovered by the above-mentioned washing operation. The recovered carbon disulfide is refined and then is recycled to step (D).

In the addition reaction elimination of carbon disulfide, a carbon disulfide-containing liquid is brought into contact with a reactant which is capable of producing an addition reaction product with carbon disulfide. The resultant addition reaction product must be insoluble in the inert organic solvent, be soluble in water, or have a boiling point higher than that of 1,3-butadiene and the inert organic solvent. The reactant usually consists of at least one nitrogen-containing compound, for example, selected from the group consisting of aliphatic amine compounds, for example, melamine, guanidine, ethylene diamine, 1,6-hexamethylenediamine, 1,12-dodecamethylenediamine, diethylenetriamine, diethylamine, n-octylamine, n-lauroamine, and di-n-butylamine; aromatic amine compounds, for example, aniline, 2,4-diaminophenol, 2,4-diaminotoluene, 2,6-diaminotoluene, 2,2'-diaminodiphenylmethane, 2,4'-diaminodiphenylmethane, 4,4'-diaminodiphenylmethane, o-phenylenediamine, m-phenylenediamine, p-phenylenediamine, 3,5-diaminobenzoic acid, p-diaminoazobenzene, 4,4-disminodiphenylamine, benzidine, 3,3-diaminobenzidine, 1,2,4,5-tetraminobenzene, p,p'-diaminodiphenyloxide, piperidine, and benzylamine; and cycloaliphatic amine compounds, for example, cyclohexylamine and cyclopentylamine.

The nitrogen-containing reactant is added to a carbon disulfide-containing liquid. The amount of the reactant is preferably in the range of from 1 to 20 moles per mole of carbon disulfide contained in the liquid. The mixture of the reactant with the carbon disulfide-containing liquid is stirred at a temperature of from 5° C. to 60° C. for from 5 to 120 minutes so as to promote the reaction between the reactant with carbon disulfide. The resultant addition product is separated from the mixture by washing the mixture with water, distilling the mixture, filtering the mixture, or centrifuging the mixture.

After the recovery procedure is completed, the resultant mixture of 1,3-butadiene and the inert organic solvent, which mixture is substantially free from carbon disulfide, can be recycled to step (A). In this case, if necessary, necessary amounts of fresh 1,3-butadiene and inert organic solvent are added to the recycled mixture to provide a desired amount of the 1,3-polybutadiene solution having a desired concentration of 1,3-butadiene.

The process of the present invention will be further explained by referring to the accompanying drawings.

Figure 1:
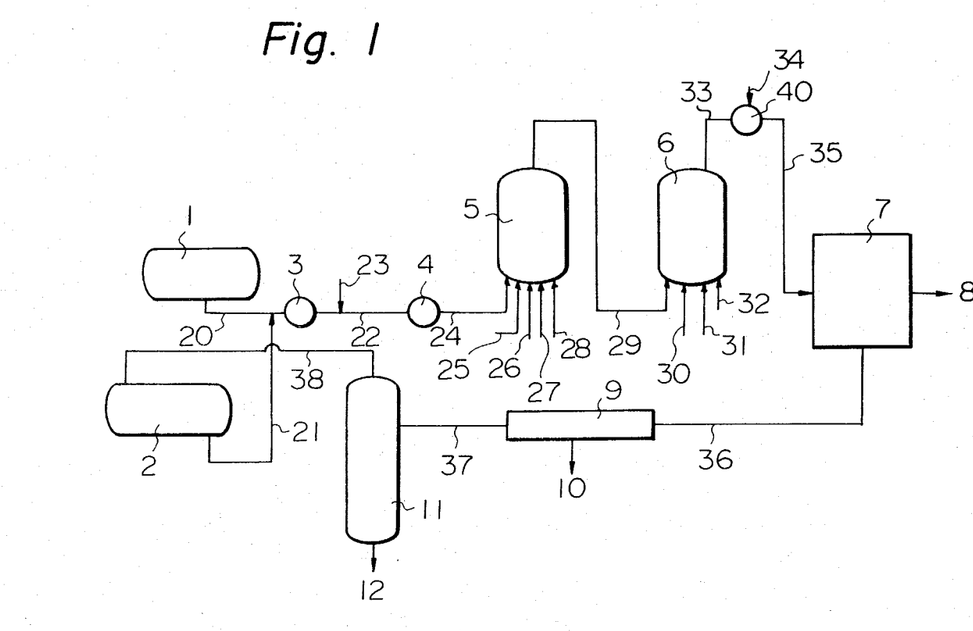
FIG. 1 is a flow sheet of an example of the process of the present invention in which a first polymerization mixture is prepared by directly mixing a controlled 1,3-butadiene solution with a cis-1,4-polymerization catalyst and in which an inert organic solvent having a boiling point higher than that of 1,3-butadiene is used.

In FIG. 1, fresh 1,3-butadiene contained in a tank 1 is introduced into a mixer 3 through a conduit 20 and a recovered solution of 1,3-butadiene in an inert organic solvent having a higher boiling point than that of 1,3-butadiene, for example, benzene, from a tank 2 into the mixer 3 through a conduit 21. The fresh 1,3-butadiene and the recovered 1,3-butadiene solution are mixed with each other in the mixer 3 to provide a 1,3-butadiene solution having a desired concentration of 1,3-butadiene. The 1,3-butadiene solution is introduced from the mixer 3 into a mixer 4 through a conduit 22. In order to control the concentration of water in the 1,3-butadiene solution to a desired value, water is fed into the conduit 22 through a water-supply conduit 23. The 1,3-butadiene solution is uniformly mixed with water in the mixer 4. The resultant controlled 1,3-butadiene solution is supplied into a cis-1,4-polymerization vessel 5 through a conduit 24. An aluminum catalytic ingredient and a cobalt catalytic ingredient are fed into the vessel 5 through a conduit 25 and a conduit 28, respectively. Also, a molecular weight modifier consisting of, for example, cyclooctadiene and an anti-gelling agent consisting of, for example, dilauryl-3,3'-thiodipropionate are fed into the vessel 5 through a conduit 26 and a conduit 27, respectively. The resultant first polymerization mixture is stirred in the vessel 5 to produce a cis-1,4-polybutadiene. The resultant polymerization mixture containing cis-1,4-polybutadiene is transferred from the vessel 5 to a 1,2-polymerization vessel 6 through a conduit 29. A cobalt catalytic ingredient is supplied to the vessel 6 through a conduit 30, an aluminum catalytic ingredient consisting of the aluminum compound of the formula (II) is fed into the vessel 6 through a conduit 31, and carbon disulfide is fed into the vessel 6 through a conduit 32. The aluminum catalytic ingredient and/or carbon disulfide may be fed into the conduit 29. The resultant second polymerization mixture in the vessel 6 is stirred so as to allow the cis-1,4-polybutadiene and the non-reacted 1,3-butadiene to be converted to a polybutadiene rubber consisting essentially of 5% to 30% by weight of a boiling n-hexane-insoluble fraction and 70% to 95% by weight of a boiling n-hexane-soluble fraction. During the 1,2-polymerization procedure, a polymer insoluble in the inert organic solvent deposits from the polymerization mixture onto the inside surface of the vessel 6 and the viscosity of the polymerization increases. Therefore, it is preferable that the 1,2-polymerization vessel 6 have an agitator equipped with a device for removing the deposited polymer from the inside surface of the vessel.

The resultant polymerization mixture in the 1,2-polymerization vessel 6 is introduced into a polymerization shortstopping vessel 40 through a conduit 33. Also, a polymerization shortstopper is fed into the vessel 40 through a conduit 34 so as to shortstop the 1,2-polymerization. The polymerization shortstopped mixture is introduced into an isolating apparatus 7 through a conduit 35. In the isolating apparatus 7, the resultant polybutadiene rubber is isolated so as to leave an isolation residue containing non-reacted 1,3-butadiene, the inert organic solvent, and carbon disulfide. The isolated polybutadiene rubber is removed through a passage 8. The isolation residue is introduced into an apparatus 9 for eliminating carbon disulfide from the isolation residue by means of adsorption or addition reaction. The eliminated carbon disulfide is removed from the apparatus 9 through a passage 10.

Figure 2:
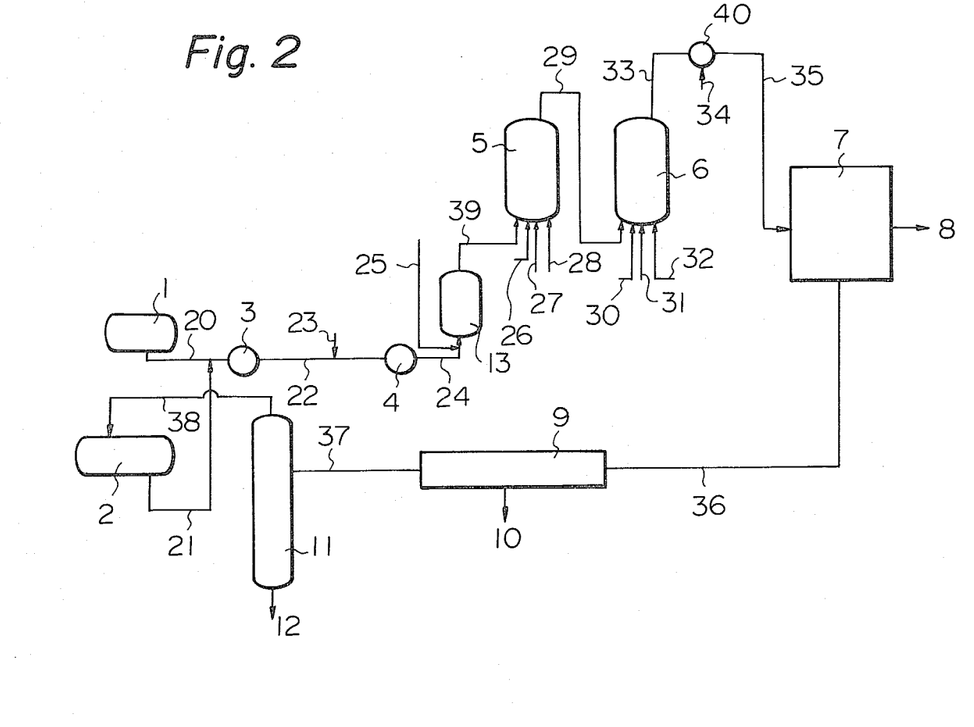
FIG. 2 is a flow sheet of another example of the process of the present invention in which an inert organic solvent having a boiling point higher than that of 1,3-butadiene is used and in which a first polymerization mixture is prepared by aging a mixture of a controlled 1,3-butadiene solution with an aluminum catalytic ingredient and then by mixing the aged mixture with a cobalt catalytic ingredient.

The residue containing the non-reacted 1,3-butadiene and the inert organic solvent and retained in the apparatus 9 is fed into a distillation apparatus 11 which may be composed of a single distillation column or of two or more distillation columns, through a conduit 37. In the distillation apparatus, a mixture of the non-reacted 1,3-butadiene and the inert organic solvent, which mixture is substantially free from carbon disulfide, is recovered and in introduced into the tank 2 through a conduit 38. A distillation residue containing a high boiling point substance is removed from the distillation apparatus 11 through a passage 12. Referring to FIG. 2, the apparatus is composed of the same devices as those indicated in FIG. 1, with the following exceptions. That is, an aging vessel 13 is inserted between the mixer 4 and the cis-1,4-polymerization vessel 5. The mixer 4 is connected to the aging vessel 13 through the conduit 24 and a conduit 25 for feeding an aluminum catalytic ingredient of the cis-1,4-polymerization catalyst is connected to the conduit 24. The aging vessel 13 is connected to the cis-1,4-polymerization vessel 5 through a conduit 39.

The controlled 1,3-butadiene solution is mixed with the aluminum catalytic ingredient in the conduit 24 and the resultant mixture is aged in the aging vessel 13 for a predetermined time period. The aged mixture is fed into the cis-1,4-polymerization vessel 5 through the conduit 39 and is mixed in the vessel 5 with a molecular weight modifier fed through the conduit 26, an anti-gelling agent fed through the conduit 27, and a cobalt catalytic ingredient fed through the conduit 28.

The above-mentioned aging procedure is effective for reducing the amount of the cobalt catalytic ingredient necessary for obtaining the cis-1,4-polymerization catalyst having a satisfactory catalytic activity. Accordingly, the resultant polybutadiene rubber contains a reduced amount of residual cobalt. This feature is effective for reducing the degradation of the polybutadiene rubber products.

SPECIFIC EXAMPLES

The present invention will be further explained in the following examples. In the examples, the amount of the boiling n-hexane-insoluble fraction of the resultant polybutadiene rubber was determined by immersing 2 g of the polybutadiene rubber in 200 ml of n-hexane at room temperature, by separating a fraction of the rubber insoluble in n-hexane by means of filtration, by extracting the n-hexane insoluble fraction at a boiling point of n-hexane by using a Soxhlet's extractor for 4 hours, by separating the non-extracted fraction from n-hexane, by drying it under vacuum, and, finally, measuring the weight of the dried fraction.

The amount of the boiling n-hexane-soluble fraction of the polybutadiene rubber was determined by subjecting the resultant extracted solution from the above-mentioned extraction procedure to an evaporation procedure in which n-hexane was evaporated from the solution, drying the residual fraction under vacuum, then measuring the weight of the dried fraction.

The content of the cis-1,4-structure in the boiling n-hexane-soluble fraction in the polybutadiene rubber and the content of the cis-1,4-structure in the cis-1,4-polymerization product were determined by means of infrared absorption spectrum analysis (IR).

The content of the 1,2-structure in the boiling n-hexane-insoluble fraction of the polybutadiene rubber was determined by means of nuclear magnetic resonance spectrum (NMR).

The melting point of the boiling n-hexane-insoluble fraction of the polybutadiene rubber was determined from a temperature at a peak point appearing in an endothermic curve of the polybutadiene rubber measured by a recording differential scanning calorimeter (DSC).

The intrinsic viscosities $[\eta]$ of the boiling n-hexane-soluble fraction of the polybutadiene rubber and of the cis-1,4-polymerization product were determined in toluene at a temperature of 30° C.

The reduced viscosity $[\eta_{SP}/c]$ of the boiling n-hexane-insoluble fraction of the polybutadiene rubber was determined in tetrahydronaphthalene at a temperature of 135° C.

The concentration of carbon disulfide in a carbon disulfide-containing liquid was determined by using a gas chromatograph equipped with a flame spectrophotometer and containing therein a filler consisting of chromosolve 102 (trademark, made by Gasukuro Kogyo Co., Ltd.).

Example 1

A solution containing 23.7% by weight of 1,3-butadiene dissolved in benzene was dehydrated by using a dehydrating column. The dehydrated 1,3-butadiene solution was mixed with 40 mg/l (2.2 millimoles/l) of water and the mixture was stirred so as to allow water to be dissolved in the 1,3-butadiene solution. The resultant controlled solution was cooled to a temperature of −3° C., the was continuously introduced at a flow rate of 50 l/hr into a cis-1,4-polymerization vessel. The vessel was a stainless steel autoclave having an inside volume of 20 liters and equipped with double helical-type stirring paddles and a jacket for controlling the temperature of the contents of the autoclave. An aqueous solution of calcium chloride ($CaCl_2$) was circulated through the jacket at a temperature of −10° C.

Also, into the cis-1,4-polymerization vessel, diethylaluminum monochloride was introduced at a flow rate of 25.3 g/hr, 1,5-cyclooctadiene at a flow rate of 60.0 g/hr, dilauryl-3,3′-thiodipropionate (TPL) at a flow rate of 7.0 g/hr, and cobalt octoate at a flow rate of 260 mg/hr. The resultant first polymerization mixture was stirred at a temperature of 40° C. for an average residing time of 24 minutes to cis-1,4-polymerize the 1,3-butadiene. During the cis-1,4-polymerization procedure, cis-1,4-polybutadiene was produced at a rate of 3.22 kg/hr. The resultant polymer contained 96% or more of cis-1,4-structure and had an intrinsic viscosity of 1.8. The content of gel produced in the polymer was 0.02% by weight, determined by using a 200 mesh screan. The resultant polymerization mixture in the cis-1,4-polymerization vessel was introduced at a flow rate of 50 liters/hr into a 1,2-polymerization vessel of the same type as the cis-1,4-polymerization vessel. Also, the 1,2-polymerization vessel was fed with triethylaluminum at a flow rate of 27.3 g/hr, cobalt octoate at a flow rate of 842 mg/hr, and carbon disulfide at a flow rate of 840 mg/hr. The resultant second polymerization mixture was stirred at a temperature of 40° C. for an average residing time of 24 minutes so as to 1,2-polymerize the non-reacted 1,3-butadiene. The resultant polymerization mixture was continuously introduced into a polymerization shortstopping vessel equipped with stirring paddles and was mixed with a small amount of tris (nonylphenol) phosphite and then with water so as to shortstop the 1,2-polymerization reaction. The resultant mixture was introduced at a flow rate of 120 liters/hr into a steam stripper equipped with stirring paddles and was mixed with hot water and saturated steam introduced into the stripper under a pressure of 4 kg/cm² G. The mixture was dispersed in the hot water so as to allow the volatile substances in the mixture to evaporate away. The resultant aqueous slurry of the polybutadiene was removed from the steam stripper. The polybutadiene rubber in the form of crumbs and water were separated from the aqueous slurry. The separated polybutadiene rubber was dried at room temperature under vacuum.

The above-mentioned procedures were continuously carried out for 14 hours. The polybutadiene rubber was produced at a rate of 3.62 kg/hr. The polybutadiene rubber contained 11.1% of a boiling n-hexane-insoluble fraction having a melting point of 205° C. and a reduced viscosity $[\eta_{sp}/C]$ of 2.1 (dl/g) and containing 93.1% of 1,2-structure. The remaining boiling n-hexane soluble fraction of the polybutadiene rubber contained 96.9% of cis-1,4-structure and had an intrinsic viscosity of 1.8.

After the polymerization procedures were completed, a fresh 1,3-butadiene solution was passed through the polymerization apparatus at a flow rate of 50 liters/hr for 30 minutes. Thereafter, the polymer adhering on the inside surface of the polymerization vessels and on the surfaces of the stirring paddles was collected. The collected polymer was dried under vacuum. The amount of the polymer collected in the cis-1,4-polymerization vessel was 18 g containing 3 g of gel. The amount of the polymer collected in the 1,2-polymerization vessel was 99 g.

The volatile substance evaporated from the steam stripper was cooled and was condensed. The condensed substance was separated into an aqueous phase and a organic solvent phase. The organic solvent phase was isolated from the aqueous phase. A portion of the isolated organic solvent solution was subjected to an elimination process of carbon disulfide, and to a recovery process of 1,3-butadiene, and benzene in the following manner.

The isolated organic solvent solution, which contained 16.1% by weight of 1,3-butadiene and 12.5 mg/l of carbon disulfide and was in an amount of 300 liters, was passed at a flow rate of 50 liters/hr at a temperature of 15° C. to 20° C. through a first adsorption column. The first column contained therein an adsorption filler having a height of 70 cm and a diameter of 10 cm and consisting of a basic anion exchange resin available under a trademark of Diaion WA-20, made by Mitsubishi Chemical Ind. It was then passed through a second absorption column. The second column contained therein an absorption filler which had a height of 30 cm and diameter of 10 cm and consisted of a strong basic amion exchange resin available under a trademark of Diaion PA-316, made by Mitsubishi Chemical Ind. This eliminated the carbon disulfide from the organic solvent soluiton. The organic solvent solution discharged from the second adsorption column was substantially free from carbon disulfide and was distilled at a temperature of 120° C. to 160° C. so as to leave a high boiling point substance. The distilled solution consisted of 1,3-butadiene and benzene and recycled to the water-controlling step.

The anion exchange resins used were reactivated by treating them with an aqueous HCl solution and then with an aqueous NaOH solution.

By the above-mentioned adsorption procedures, 98% or more of the carbon disulfide was eliminated from the isolated organic solvent solution. The resultant solution of 1,3-butadiene in benzene was substantially free from carbon disulfide.

The remaining portion of the isolated organic solvent solution was subjected to another elimination process of carbon disulfide, and to the same recovery process of 1,3-butadiene and benzene as that described above.

That is, 300 liters of the isolated organic solvent solution was mixed with 65 g of hexamethylenediamine. The mixture was stirred at a room temperature of about 20° C. for 50 minutes. Next, 90 liters of a 1% sodium hydroxide aqueous solution was added to the mixture. The admixture was vigorously stirred and, thereafter, was left standing so as to allow an aqueous phase to be separated from an organic solvent solution phase. After the aqueous phase was removed, the remaining organic solvent solution was mixed with 90 liters of water, was stirred, and was left standing to remove an aqueous phase from an organic solvent solution phase. The above-mentioned procedures were repeated twice. The resultant organic solvent solution was washed with water and distilled to remove a high boiling point substance therefrom.

By the above-mentined procedures, 95% or more of carbon disulfide was removed from the organic solvent solution. The resultant solution of 1,3-butadiene in benzene was substantially free from carbon disulfide. The recovered 1,3-butadiene solution was recycled to the water-controlling step.

Example 2

The same procedures as those described in Example 1 were carried out with the following exceptions.

The same controlled 1,3-butadiene solution as that described in Example 1 was introduced at a flow rate of 50 liters/hr into an aging vessel equipped with stirring paddles and having an inside volume of 20 liters while diethylaluminum monochloride was introduced at a flow rate of 25.0 g (208 millimoles)/hr into the aging vessel. The resultant mixture was aged in the aging vessel at a temperature of 30° C. for an average residence time of 24 minutes. The aged mixture was cooled to a temperature of −3° C. and then introduced at a flow rate of 50 liters/hr into the same type of cis-1,4-polymerization vessel as that described in Example 1, while introducing, into the cis-1,4-polymerization vessel, cobalt octoate at a flow rate of 264 mg (0.77 millimoles)/hr, 1,5-cyclooctadiene at a flow rate of 60.0 g (0.556 moles)/hr, and dilauryl-3,3'-thiodipropionate (TPL) at a flow rate of 7.0 g (13.6 millimoles)/hr, to provide the first polymerization mixture.

By the cis-1,4-polymerization procedure at a polymerization temperature of 40° C. for an average residing time of 24 minutes, cis-1,4-polybutadiene was produced at a rate of 3.52 kg/hr. The resultant polymer contained 98% or more of cis-1,4-structure and had an intrinsic viscosity of 1.9 and on content of gel of 0.01% or less which was determined by using a 200 mesh screen.

The resultant polymerization mixture was introduced at a flow rate of 50 liters/hr into the same type of 1,2-polymerization vessel as that described in Example 1, while introducing, into the 1,2-polymerization vessel, triethylaluminum at a flow rate of 27.5 g (241 millimoles)/hr, cobalt octoate at a flow rate of 840 mg (2.36 millimoles)/hr, and carbon disulfide at a flow rate of 750 mg (9.87 millimoles)/hr. The resultant second polymerization mixture was subjected to the 1,2-polymerization under the same conditions as those described in Example 1.

The 1,2-polymerization reaction was shortstopped by introducing the polymerization mixture into the same type of polymerization shortstopping vessel as that described in Example 1 and by mixing it with 2,6-di-tert-butyl-4-methylphenol in an amount of 1 part per 100 parts of the resultant polybutadiene rubber and with a small amount of methyl alcohol.

The procedures for producing the polybutadiene rubber were continuously carried out for 16 hours. The polybutadiene rubber was obtained in an amount of 4,00 kg/hr and contained 12.0% by weight of the boiling n-hexane-insoluble fraction thereof. The boiling n-hexane-isoluble fraction exhibited a melting point of 205° C. and a reduced viscosity [$\eta_{sp}$/C] of 2.1 (dl/g) and contained 93.1% of 1,2-structure. The remaining boiling n-hexane-soluble fraction of the resultant polybutadiene rubber contained 96.9% of cis-1,4-structure and had an intrinsic viscosity [$\eta$] of 1.8.

After the cis-1,4-polymerization vessel and the 1,2-polymerization vessel were washed with the fresh 1,3-butadiene solution in the same manner as that described in Example 1, it was found that the polymer removed from the cis-1,4-polymericzation vessel was in an amount of 12 g including 2 g of gel and the polymer removed from the 1,2-polymerization vessel was in an amount of 98 g.

The non-reacted 1,3-butadiene, the inert organic solvent (benzene), and carbon disulfide were recovered by the following manner.

The organic solvent solution was isolated from the residue of the resultant polymerization mixture in the same manner as that described in Example 1. The isolated solution contained 15.6% by weight of 1,3-butadiene and 12 mg/l of carbon disulfide.

Three hundred liters of the isolated organic solvent solution was passed at a flow rate of 50 liters/hr at a temperature of 15° C. to 20° C. through a first absorption column containing therein an absorption filler having a height of 70 cm and a diameter of 10 cm and consisting of a basic anion exchange resin (Amberlite 1R-45, containing 5.5 meq/g of amino radicals), and then through the same second adsorption column as that described in Example 1, to eliminate carbon disulfide from the organic solvent solution. The adsorption procedure resulted in elimination of carbon disulfide in an amount of 98% or more from the isolated organic solvent solution. The organic solvent solution discharged from the second adsorption column was a solution of 1,3-butadiene in benzene and was free from carbon disulfide.

Examples 3 and 4

In Example 3, the polybutadiene rubber produced in Example 1 was converted into a composition as indicated in Table 1.

TABLE 1

| Component | Amount (part by weight) |
|---|---|
| Polybutadiene rubber | 100 |
| HAF Carbon Black(*) | 50 |
| Aromatic process oil | 10 |
| Zinc oxide | 5 |
| Stearic acid | 2 |
| Amine type antioxidant | 1 |
| Cyclohexyl-benzothiazyl sulfenamide | 1 |

TABLE 1-continued

| Component | Amount (part by weight) |
|---|---|
| Sulfur | 1.5 |

Note:
Oil adsorption: 120 g per 100 g of the carbon black
Surface area: 85 m$^2$ per g of the carbon black The composition was uniformly mixed by using a Bambury mixer having a capacity of 1.7 l and, then, by using a roll mill, and vulcanized at a temperature of 140° C. for 30 minutes. The vulcanizing procedure was applied to a portion of the composition which was subjected to the measurement of a cut growth resistance of the vulcanized rubber, at 140° C. for 75 minutes. The properties of the vulcanized rubber was determined in accordance with Japanese Industrial Standard K-6301.

In Example 4, the same procedures as those described in Example 3 were carried out except that the polybutadiene rubber used was one produced in Example 2.

For the purpose of comparison, the same procedures as those mentioned above were carried out, except that the polybutadiene rubber was replaced by a commercially available high cis-1,4-polybutadiene.

The properties of the vulcanized rubber of the present example and the comparative vulcanized rubber are indicated in Table 2.

TABLE 2

| Item | Example 3 | Example 4 | Comparative Composition |
|---|---|---|---|
| Hardness | 71 | 71 | 60 |
| 300% modulus (kg/cm$^2$) | 147 | 145 | 83 |
| Ultimate elongation (%) | 400 | 400 | 540 |
| Tensile strength (kg/cm$^2$) | 183 | 181 | 190 |
| Tear resistance (kg/cm$^2$)(*)$_1$ | 59 | 61 | 48 |
| Resilience % | 50 | 50 | 64 |
| Cut growth resistance(*)$_2$ | 65,000 | 71,000 | 3,000 |

Note:
(*)$_1$The tear resistance was measured by using B-type dumbbell described in JIS K-6301.
(*)$_2$The cut growth resistance was measured by the De Mattia flexmachine and was represented by the number of flexing operations at which the length of a crack in a testing specimen reached from 2 mm to 15 mm.

We claim:
1. A process for producing a polybutadiene rubber with enhanced mechanical strength, comprising the successive steps of:
(A) mixing 1,3-butadiene with an inert organic solvent to provide a 1,3-butadiene solution;
(B) controlling a concentration of water contained in said 1,3-butadiene solution to from 0.2 to 5 millimoles per liter of said 1,3-butadiene solution;
(C) subjecting a first polymerization mixture which comprises said controlled 1,3-butadiene solution and a cis-1,4-polymerization catalyst comprising:
(a) an aluminum catalytic ingredient consisting of at least one organic aluminum compound of the formula (I):

$$AlR_nX_{3-n} \qquad (I)$$

wherein R represents a member selected from the group consisting of alkyl radicals having 1 to 6 carbon atoms, a phenyl radical and cycloalkyl radicals, X represents a halogen atom and n represents the number of 1.5 to 2.0, and
(b) a cobalt catalytic ingredient consisting of at least one cobalt compound soluble in said inert organic solvent, to a cis-1,4-polymerization to convert at least a portion of said 1,3-butadiene contained in said first polymerization mixture to cis-1,4-polybutadiene;

(D) subjecting a second polymerization mixture which comprises the resultant cis-1,4-polybutadiene, non-reacted 1,3-butadiene, the organic solvent, and an 1,2-polymerization catalyst comprising:

(c) a cobalt catalytic ingredient consisting of at least one cobalt compound soluble in the inert organic solvent, (d) an aluminum catalytic ingredient consisting of at least one organic aluminum compound of the formula (II):

$$AlR_3 \quad (II)$$

wherein R is the same as defined above, and (e) carbon disulfide, to a 1,2-polymerization to provide a polybutadiene rubber consisting essentially of 5% to 30% by weight of a boiling n-hexane-insoluble fraction and 95 to 70% of a n-hexane-soluble fraction:

(E) stopping said 1,2-polymerization by adding a polymerization shortstopper to the resultant second polymerization mixture; and (F) isolating the resultant polybutadiene rubber from the stopped second polymerization mixture.

2. The process as claimed in claim 1, wherein the amount of 1,3-butadiene in said 1,3-butadiene solution in step (A) is at least 3% based on the sum of the weights of 1,3-butadiene and said inert organic solvent.

3. The process as claimed in claim 1, wherein said inert organic solvent consists essentially of at least one member selected from the group consisting of aromatic hydrocarbons, aliphatic hydrocarbons, cycloaliphatic hydrocarbons, and halogenated derivatives of the above-mentioned hydrocarbons.

4. The process as claimed in claim 1, wherein in step (B), the amount of water in said 1,3-butadiene solution is controlled to a range of from 0.5 to 5 millimoles per liter of said 1,3-butadiene solution.

5. The process as claimed in claim 1, wherein said first polymerization mixture is prepared by mixing the controlled 1,3-butadiene solution with said cis-1,4-polymerization catalyst.

6. The process as claimed in claim 1, wherein said controlled 1,3-butadiene solution is cooled to a temperature of 10° C. or less.

7. The process as claimed in claim 1, wherein said aluminum compound of the formula (I) in said cis-1,4-polymerization catalyst is selected from the group consisting of diethyl aluminum monochloride, diethyl aluminum monobromide, diisobutyl aluminum monochloride, and ethyl aluminum sesquichloride.

8. The process as claimed in claim 1, wherein said cobalt compound in said cis-1,4-polymerization catalyst is selected from the group consisting of cobalt β-ketone complexes, cobalt β-ketoacid ester complexes, cobalt salts of organic carboxylic acids having 6 or more carbon atoms, cobalt halide complexes and cobalt complexes coordinated with butadiene.

9. The process as claimed in claim 1, wherein the amount of said aluminum catalyst ingredient (a) in said cis-1,4-polymerization catalyst is at least 0.1 millimole per mole of 1,3-butadiene in said first polymerization mixture.

10. The process as claimed in claim 1, wherein the amount of said cobalt catalytic ingredient (b) in said cis-1,4-polymerization catalyst is at least 0.001 millimole per mole of 1,3-butadiene in said first polymerization mixture.

11. The process as claimed in claim 1, wherein the molar ratio of said aluminum catalytic ingredient (a) to said cobalt ingredient (b) in said cis-1,4-polymerization catalyst is at least 5.0.

12. The process as claimed in claim 1, wherein said first polymerization mixture is prepared by mixing the controlled 1,3-butadiene solution of step (B) with an aluminum catalytic ingredient (a') consisting of at least one organic aluminum compound of the formula (Ia):

$$AlR_2X \quad (Ia)$$

wherein R and X are the same as defined above, by aging the resultant mixture for at least one minute, and, then, by admixing said aged mixture with said cobalt catalytic ingredient (b).

13. The process as claimed in claim 12, wherein said aging operation is carried out at a temperature of from 10° C. to 80° C.

14. The process as claimed in claim 12, wherein said organic aluminum compound of the formula (Ia) is selected from the group consisting of diethyl aluminum monochloride, diethyl aluminum monobromide, and diisobutyl aluminum monochloride.

15. The process as claimed in claim 1, wherein said cis-1,4-polymerization is carried out at a temperature of from −20° C. to 80° C.

16. The process as claimed in claim 1, wherein the resultant cis-1,4-polybutadiene in step (C) contains at least 90% of cis-1,4-structure and has an intrinsic viscosity of from 1.5 to 8 determined in toluene at a temperature of 30° C.

17. The process as claimed in claim 1, wherein said first polymerization mixture further contains a molecular weight modifier and/or an anti-gelling agent.

18. The process as claimed in claim 1, wherein said aluminum compound of the formula (II) in said 1,2-polymerization catalyst is selected from the group consisting of triethyl aluminum, trimethyl aluminum, triisobutyl aluminum, and triphenyl aluminum.

19. The process as claimed in claim 1, wherein said cobalt compound in said 1,2-polymerization catalyst is selected from the group consisting of cobalt β-ketone complexes, cobalt β-ketoacid ester complexes, cobalt salts of organic carboxylic acids having 6 or more carbon atoms, cobalt halide complexes and cobalt complexes coordinated with butadiene.

20. The process as claimed in claim 1, wherein said aluminum catalytic ingredient (d) in said 1,2-polymerization catalyst is in an amount of at least 0.1 millimole per mole of said non-reacted 1,3-butadiene in said second polymerization mixture.

21. The process as claimed in claim 1, wherein said cobalt catalytic ingredient (c) in said 1,2-polymerization catalyst is in an amount of at least 0.005 millimole per mole of said non-reacted 1,3-butadiene in said second polymerization mixture.

22. The process as claimed in claim 1, wherein said carbon disulfide in said 1,2-polymerization catalyst is in an amount of at least 0.001 millimole per mole of said non-reacted 1,3-butadiene in said second polymerization mixture.

23. The process as claimed in claim 1, wherein said 1,2-polymerization is carried out at a temperature of from −20° C. to 80° C.

24. The process as claimed in claim 1, wherein said second polymerization mixture contains said non-reacted 1,3-butadiene in a concentration of from 3% to 35% by weight.

25. The process as claimed in claim 1, wherein said polymerization shortstopper consists of at least one member selected from the group consisting of aliphatic alcohols, water, inorganic acids, organic acids, monoethanolamine, ammonia, phosphorous esters and hydrogen chloride.

26. The process as claimed in claim 24, wherein aid shotstopper is in the form of a solution thereof dissolved in water and/or aliphatic liquid alcohols.

27. The process as claimed in claim 1, wherein the isolation of said polybutadiene rubber from the resultant 1,2-polymerization mixture is carried out by adding a precipitation agent to said resultant second polymerization mixture in step (F).

28. The process as claimed in claim 1, wherein the isolation of said polybutadiene rubber is carried out by evaporating volatile substances from the resultant 1,2-polymerization mixture.

29. The process as claimed in claim 1, wherein after said polybutadiene rubber is isolated from said 1,2-polymerization mixture, the isolation residue is subjected to a recovery procedure of a mixture of non-reacted 1,3-butadiene and said inert organic solvent, which mixture is substantially free from carbon disulfide.

30. The process as claimed in claim 29, wherein said mixture of non-reacted 1,3-butadiene and the inert organic solvent is recycled to said step (A).

31. The process as claimed in claim 29, wherein carbon disulfide is eliminated from said isolation residue.

32. The process as claimed in claim 31, wherein said carbon disulfide is eliminated by means of adsorption thereof on an adsorbing agent or of addition reaction thereof with a reactant capable of reacting with carbon disulfide and of forming an addition reaction product insoluble in said inert organic solvent, soluble in water, or having a boiling point significantly higher than that of 1,3-butadiene and said inert organic solvent.

33. The process as claimed in claim 32, wherein said adsorbing agent consists of a basic anion exchange resin containing amino radicals.

34. The process as claimed in claim 32, wherein said reactant consists of at least one nitrogen-containing compound selected from the group consisting of aliphatic amine compounds, aromatic amino compound, and cycloaliphatic amine compounds.

* * * * *